United States Patent
Potkonjak et al.

(10) Patent No.: US 6,931,612 B1
(45) Date of Patent: Aug. 16, 2005

(54) DESIGN AND OPTIMIZATION METHODS FOR INTEGRATED CIRCUITS

(75) Inventors: Miodrag Potkonjak, Freemont, CA (US); Seapahn Megerian, West Hills, CA (US); Advait Mogre, Sunnyvale, CA (US); Dusan Petronavic, Cupertino, CA (US)

(73) Assignee: LSI Logic Corporation, Milpitas, CA (US)

( * ) Notice: Subject to any disclaimer, the term of this patent is extended or adjusted under 35 U.S.C. 154(b) by 323 days.

(21) Appl. No.: 10/146,363

(22) Filed: May 15, 2002

(51) Int. Cl.[7] ............................................. G06F 17/50
(52) U.S. Cl. ................................. 716/5; 716/7; 716/8
(58) Field of Search .................... 716/5, 7, 8; 717/104, 717/114, 135, 151

(56) References Cited

U.S. PATENT DOCUMENTS

| | | | | |
|---|---|---|---|---|
| 5,031,111 A | * | 7/1991 | Chao et al. ..................... | 716/7 |
| 5,406,497 A | * | 4/1995 | Altheimer et al. ............. | 716/6 |
| 5,537,341 A | * | 7/1996 | Rose et al. ..................... | 716/16 |
| 5,572,436 A | * | 11/1996 | Dangelo et al. ............... | 716/18 |
| 5,841,663 A | * | 11/1998 | Sharma et al. ................ | 716/18 |
| 5,845,233 A | * | 12/1998 | Fishburn ....................... | 702/108 |
| 5,870,308 A | * | 2/1999 | Dangelo et al. ............... | 716/18 |
| 5,966,534 A | * | 10/1999 | Cooke et al. ................. | 717/155 |
| 6,051,031 A | * | 4/2000 | Shubat et al. ................. | 716/3 |
| 6,099,577 A | * | 8/2000 | Isobe ............................ | 716/2 |
| 6,260,185 B1 | * | 7/2001 | Sasaki et al. ................. | 716/18 |
| 6,269,277 B1 | * | 7/2001 | Hershenson et al. .......... | 700/97 |
| 6,334,202 B1 | * | 12/2001 | Pielmeier ..................... | 714/795 |
| 6,539,536 B1 | * | 3/2003 | Singh et al. ................... | 716/18 |
| 6,691,301 B2 | * | 2/2004 | Bowen ........................ | 717/114 |
| 6,701,501 B2 | * | 3/2004 | Waters et al. ................. | 716/8 |
| 6,735,744 B2 | * | 5/2004 | Raghunathan et al. ......... | 716/4 |
| 6,760,888 B2 | * | 7/2004 | Killian et al. ................. | 716/1 |
| 2002/0133788 A1 | * | 9/2002 | Waters et al. ................. | 716/3 |
| 2003/0014743 A1 | * | 1/2003 | Cooke et al. ................. | 717/161 |
| 2003/0208723 A1 | * | 11/2003 | Killian et al. ................. | 716/1 |
| 2004/0143801 A1 | * | 7/2004 | Waters et al. ................. | 716/3 |

FOREIGN PATENT DOCUMENTS

| | | | | | |
|---|---|---|---|---|---|
| JP | | 06176009 A | * | 6/1994 | .......... G06F 15/20 |
| WO | WO 200072096 A1 | | * | 11/2000 | .......... G05B 13/02 |

OTHER PUBLICATIONS

Meguerdichian et al., "MetaCores: Design and Optimization Techniques", Design Automation Conference, Jun. 18, 2001, pp. 585-590.*

Lee et al., "On the design automation of the memory-based VLSI architectures for FIR filters", IEEE Transactions on Consume Electronics, vol. 39, No. 3, Aug. 1993, pp. 619-629.*

(Continued)

*Primary Examiner*—Matthew Smith
*Assistant Examiner*—Phallaka Kik
(74) *Attorney, Agent, or Firm*—Conley Rose P.C.

(57) ABSTRACT

A method for optimizing an algorithm specified for implementation on an integrated circuit for a specified application. The algorithm is analyzed with respect to its performance, and estimates of implementation area and speed are calculated. Specifically, the degrees of freedom for the algorithm alternations under specific targeted implementation objective functions and constraints are identified. The algorithm solution space is then searched to identify the algorithm structure that is best suited for the specified design goals and constraints. Algorithm parameters which satisfy performance metrics and can be implemented with minimum silicon area are identified.

22 Claims, 7 Drawing Sheets

OTHER PUBLICATIONS

Wu et al., "Register minimization beyond sharing among variables", IEEE Transactions on Computer-Aided Design of Integrate Circuits and Systems, vol. 15, No. 12, Dec. 1996, pp. 1583-1587.*

NN84024652, "Area Minimization Under Geometric Constraints", IBM Technical Disclosure Bulletin, vol. 26, No. 9, Feb. 1984, pp. 4652-4653 (3 pages).*

NN9308589, "Recursive Binary Partitioning Algorithm for Database Access Skew Characterization", IBM Technical Disclosure Bulletin, vol. 36, No. 8, Aug. 1993, pp. 589-594 (7 pages).*

Joeresson et al., "Soft-output viterbi decoding: VLSI implementation issues", IEEE 43rd Vehicular Technology Conference, May 18, 1993, pp. 941-944.*

Lu et al., "Technology mapping for minimizing gate and routing area", Proceedings of Design, Automation and Test In Europe, Feb. 23, 1998, pp. 664-669.*

* cited by examiner

| K | Trellis Depth | Quantization Bits Low / high | Multi-res. Paths | Area mm$^2$ |
|---|---|---|---|---|
| 3 | 2 | 3 / NA | NA | 0.26 |
| 5 | 5 | 1 / 3 | 8 | 0.56 |
| 7 | 5 | 1 / 3 | 4 | 1.73 |

Figure 1

| Desired BER (at $E_s/N_0=1.0$) | Desired Throughput | K | L (*K) | G | $R_1$ (bits) | $R_2$ (bits) | $Q^*$ | N | M | Area ($mm^2$) |
|---|---|---|---|---|---|---|---|---|---|---|
| $1 \times 10^{-2}$ | 5 Mbps | 3 | 4 | 7,5 | 2 | NA | A | 1 | NA | 0.35 |
| $1 \times 10^{-4}$ | 2 Mbps | 5 | 6 | 35,23 | 1 | 3 | F | 1 | 5 | 1.2 |
| $1 \times 10^{-5}$ | 1 Mbps | 7 | 7 | 171,133 | 3 | NA | A | 1 | NA | 2.2 |
| $1 \times 10^{-5}$ | 3 Mbps | 7 | 7 | 171,133 | 2 | 4 | A | 1 | NA | 3.3 |
| $1 \times 10^{-9}$ | 1 Mbps | x | x | x | x | x | x | x | x | Not Feasible |

Figure 6

DESIGN AND OPTIMIZATION METHODS FOR INTEGRATED CIRCUITS

BACKGROUND OF THE INVENTION

The present invention relates to the design of integrated circuits or systems on a chip, and more particularly to a method for designing and optimizing a desired algorithm to facilitate optimum chip design.

The rapidly growing gap between silicon capacity and design productivity has resulted in a pressing need for design reuse. Hardware building blocks, usually under the name of cores, have become increasingly popular as the most efficient way of reusing design intellectual property (IP). While there exist several potential classification schemes for integrated circuits (IC) IP, the classification of cores according to their level of implementation details is by far the most popular. Currently, hardware intellectual property (IP) is delivered at three levels of abstraction: hard, firm, and soft.

Hard cores are completely implemented using a particular physical design library. Firm cores are also completely implemented, including physical design, but are targeted at a symbolic library. Finally, soft cores are described in high level languages such as VHDL or Verilog. Clearly, while hard cores provide complete information about all relevant design parameters and facilitate the highest level of performance and implementation parameter optimization for the selected library, soft cores are superior in terms of their flexibility and application range. Initially, hard cores dominated the design reuse market and practice, but recently there is an increasing trend toward other types of cores and in particular, soft cores. Additionally, parameterized, configurable, and programmable cores (such as Tensilica and Improv) have been rapidly gaining popularity.

In general, the hard cores require the most time and effort to design, but use the smallest silicon area. Soft cores can be designed most quickly, but require the largest silicon area. The firm core designs are somewhere between the hard and soft designs in terms of both the design expense and the amount of silicon required for the physical implementation.

For all types of cores, whether hard, firm or soft, the basic techniques for implementing a desired algorithm are well known. A customer will normally specify an application and a desired algorithm. The core design team starts with the selected algorithm and implements the application on a chip using one of the known approaches. Typically, the hard core approach may be selected if the application will require a large number of chips and/or if the application is expected to be used for a long period of time. If the projected number of chips is small and/or the application is expected to be useful for only a short period of time, it is probably best to implement the application on a soft core. The firm design approach falls between the hard and soft.

SUMMARY OF THE INVENTION

In accordance with the present invention, integrated circuit design begins with optimizing a selected algorithm to achieve desired functional characteristics with the minimum chip area. A selected algorithm is analyzed to identify parameters which may be varied. A solution space comprising combinations of values of the parameters is then defined. The various combinations are then simulated in software to find sets of parameters which provide desired performance. The combinations are also modeled to determine silicon area required for actual implementation at desired throughput speed by any of the known hardware implementation methods.

Where an algorithm has a large number of adjustable parameters and therefore a large solution set of possible combinations, a multiresolution search is performed. A subset of the possible parameter combinations is selected and analyzed for combinations which provide desired performance with minimum silicon area. Then, the search is expanded about the best points identified in the first analysis.

The search and simulation process is continued to identify which of the combinations of parameters that meet performance specifications can be implemented on the minimum chip area. The result is an optimized algorithm which provides the desired performance and can be implemented on the minimum chip space. The optimized algorithm may then be actually implemented using known chip design methods.

BRIEF DESCRIPTION OF THE DRAWINGS

FIG. 1 is a table illustrating three instances of a Viterbi decoder and silicon area needed for implementation.

FIG. 6 is a table of Viterbi decoder results with several BER and throughput requirements.

DETAILED DESCRIPTION OF EMBODIMENTS

The present invention provides a new approach for designing integrated circuits. The new design approach starts at the algorithm level and leverages on the algorithm's intrinsic optimization degrees of freedom. The approach has four main components: (i) problem formulation and identification of optimization degrees of freedom, (ii) objective functions and constraints, (iii) cost evaluation engine, and (iv) multiresolution design space search. The approach has been applied to the development of Viterbi decoders. Experimental results demonstrate the effectiveness of the new approach.

The present invention is a new approach to IC IP development because it considers design optimization and its suitability for efficient implementation at an even higher level than the high-level language specification. An algorithm for a particular application that is the target for creating the core is analyzed with respect to its performance, and implementation area and speed are estimated. The degrees of freedom for the algorithm alternations under specific targeted implementation objective functions and constraints are identified. The algorithm solution space is then searched to identify the algorithm structure that is best suited for the specified design goals and constraints.

Figure 2:
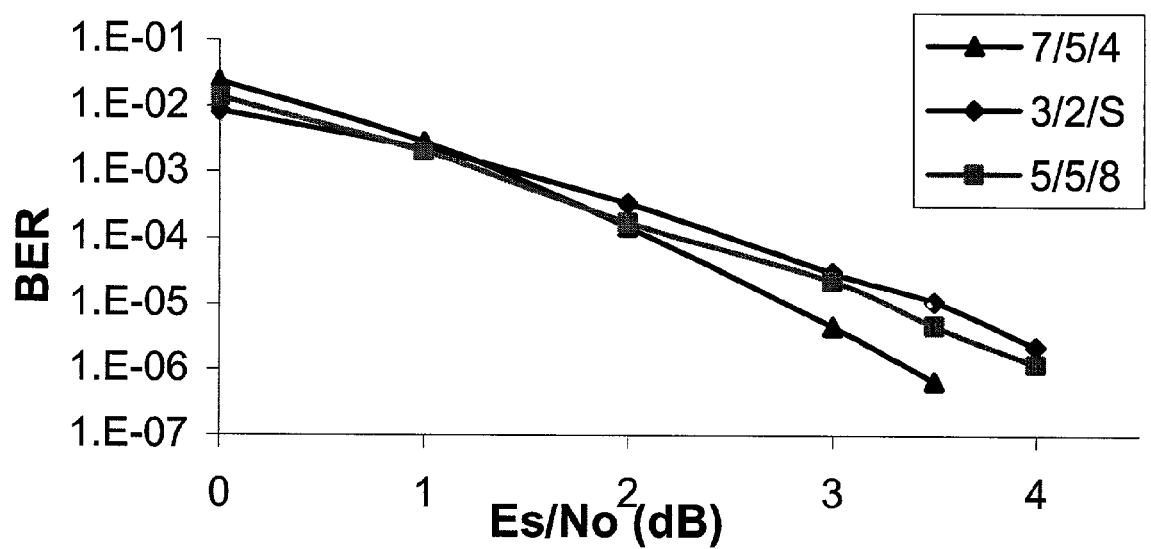
FIG. 2 is a plot of bit error rate versus signal to noise ratio for the three instances of a Viterbi decoder specified in FIG. 1.

The invention will first be illustrated with a simple example. Altering several key parameters in the Viterbi decoding algorithm used in convolutional forward-error-correction, can have tremendous impacts on the attributes of the final design. Although an experienced designer may successfully guess the general outcome of changing each parameter, initially, it is not always clear exactly what configuration is best suited for a specific application. As an example, FIG. 1 presents a table with three different instances of a Viterbi decoder. Each instance is obtained by altering only a subset of the parameters that effect the Viterbi algorithm, that is K, trellis depth, quantization bits and multiresolution paths. The three main metrics are used to evaluate the performance of the Viterbi decoder: bit-error-rate, throughput, and chip area. FIG. 1 lists the specific parameters used and the estimated area requirements for each instance when the desired throughput is fixed at 1 Mbps (megabytes per second). FIG. 2 shows the bit-error-rate (BER) curves obtained by software simulation for each case, under varying signal-to-noise ratios. These curves show that the performance of each instance is essentially identical.

Although all three cases identified in FIG. 1 exhibit comparable BER curves as shown in FIG. 2, each can have drastically different area requirements when the desired throughput is fixed as shown in FIG. 1. This example illustrates the importance of selecting the best parameters for the algorithm. Essentially the same performance can be achieved with the three specified sets of parameters, but with silicon areas of 0.26 mm$^2$, 0.56 mm$^2$ and 1.73 mm$^2$. The parameter set which can be implemented on only 0.26 mm$^2$ of silicon is obviously much preferred over the parameter set which would require 1.73 m$^2$ of silicon to implement. Here only a few parameters were selected while in general, the solution space is very large and complex.

This simple example demonstrates the importance and effectiveness of leveraging the potential of algorithm design through performance simulation and area and speed estimation. Note that performance indicates quantified qualities from the application point of view. For example, in error correction applications, algorithm performance is measured by the bit error rate. The present invention is the first effective quantitative algorithm design method.

In most modern communication systems, channel coding is used to increase throughput, add error detection and correction capabilities, and provide a systematic way to translate logical bits of information to analog channel symbols used in transmission. Convolutional coding and block coding are the two major forms of channel coding used today. As their names imply, in convolutional coding the algorithms work on a continuous stream of data bits while in block coding chunks of data bits or symbols are processed together. Also, since convolutional forward error correction (FEC) works well with data streams affected by the atmospheric and environmental noise (Additive White Gaussian Noise) encountered in satellite and cable communications, they have found widespread use in many advanced communication systems. Viterbi decoding is one of the most popular FEC techniques used today.

Figure 3:
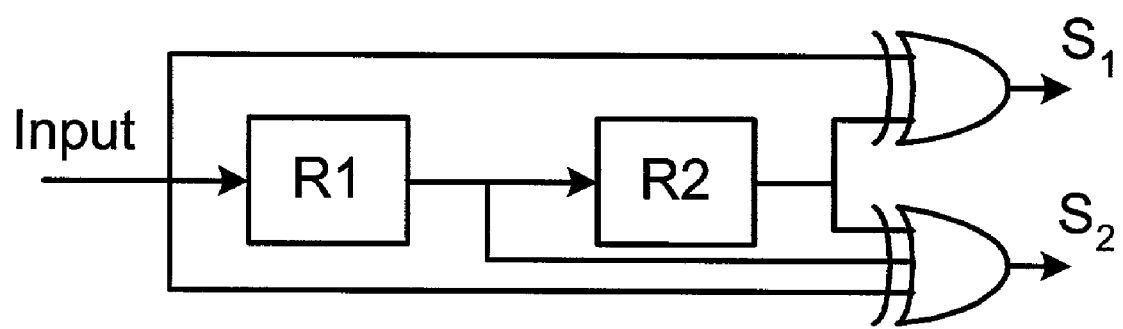
FIG. 3 is a schematic diagram of a convolutional encoder.

Convolutional codes are usually defined using the two parameters, code rate (k/n) and constraint length (K). The code rate of the convolutional encoder is calculated as the ratio k/n where k is the number of input data bits and n is the number of channel symbols output by the encoder. The constraint length K is directly related to the number of registers in the encoder. These (shift) registers hold the previous data values that are systematically convolved with the incoming data bits. This redundancy of information in the final transmission stream is the key factor enabling the error correction capabilities that are necessary when dealing with transmission errors. FIG. 3 shows an example of a ½ rate encoder with K=3 (4 states).

The simple encoder in FIG. 3 generates two channel symbols as each incoming data bit is shifted into register R1. The connections from the registers to the output XOR gates are defined by the polynomial G. There are many studies that show the optimal K and G in different situations. It is interesting to note that although the ½ rate encoding effectively reduces the channel bandwidth by a factor of two, the power savings that are gained due to the increased reliability of the channel offset the negative effects of the reduced bandwidth and overall, the technique improves the efficiency of the channel.

Viterbi decoding and sequential decoding are the two main types of algorithms used with convolutional codes. Although sequential decoding performs very well with long-constraint based convolutional codes, it has a variable decoding time and is less suited for hardware implementations. On the other hand, the Viterbi decoding algorithm developed by Andrew J. Viterbi, one of the founders of Qualcomm Corporation, has fixed decoding times and is well suited for hardware implementations. The exponentially increasing computation requirements as a function of constraint length (K) limit current implementations of the Viterbi decoder to about K=9.

Figure 4:
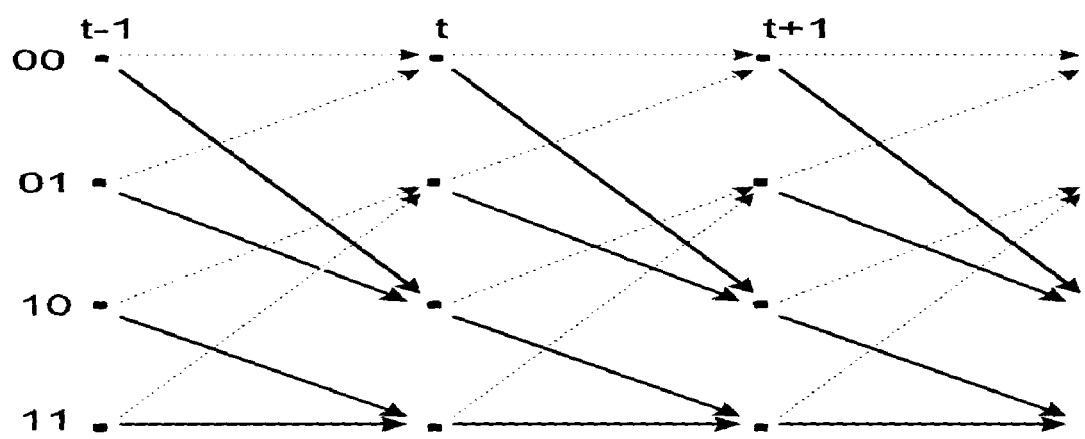
FIG. 4 is a Viterbi trellis diagram.

Viterbi decoding, also known as maximum-likelihood decoding, is comprised of the two main tasks of updating the trellis and trace-back. The trellis used in Viterbi decoding is essentially the convolutional encoder state transition diagram with an extra time dimension. FIG. 4 shows an example of a trellis diagram for the 4-state (K=3) Viterbi decoder. The four possible convolutional encoder states are depicted as four rows in the trellis. The solid lines represent transitions based on 1 inputs and the dashed lines represent transitions based on 0 inputs. There are two channel symbols produced by the encoder associated with each branch in the trellis.

After each time instance, t, the elements in the column t contain the accumulated error metric for each encoder state, up to and including time t. Every time a pair of channel symbols is received, the algorithm updates the trellis by computing the branch metric associated with each transition. In hard decision decoding, the branch metric is most often defined to be the Hamming distance between the channel symbols and the symbols associated with each branch. So for hard decision ½ rate decoding (2 channel symbols per branch), the possible branch metric values are 0, 1, and 2, depending on the number of mismatched symbols. The total error associated with taking each branch is the sum of the branch metric and the accumulated error value of the state from which the branch initiates. Since there are two possible transitions (branches) into each state, the smaller of the two accumulated error metrics is used to replace the current value of each state.

The state with the lowest accumulated error metric is chosen as the candidate for trace-back. The path created by taking each branch leading to the candidate state is traced back for a predefined number of steps. The initial branch in the trace-back path indicates the most likely transition in the convolutional encoder and can therefore be used to obtain the actual encoded bit value in the original data stream.

Figure 5:
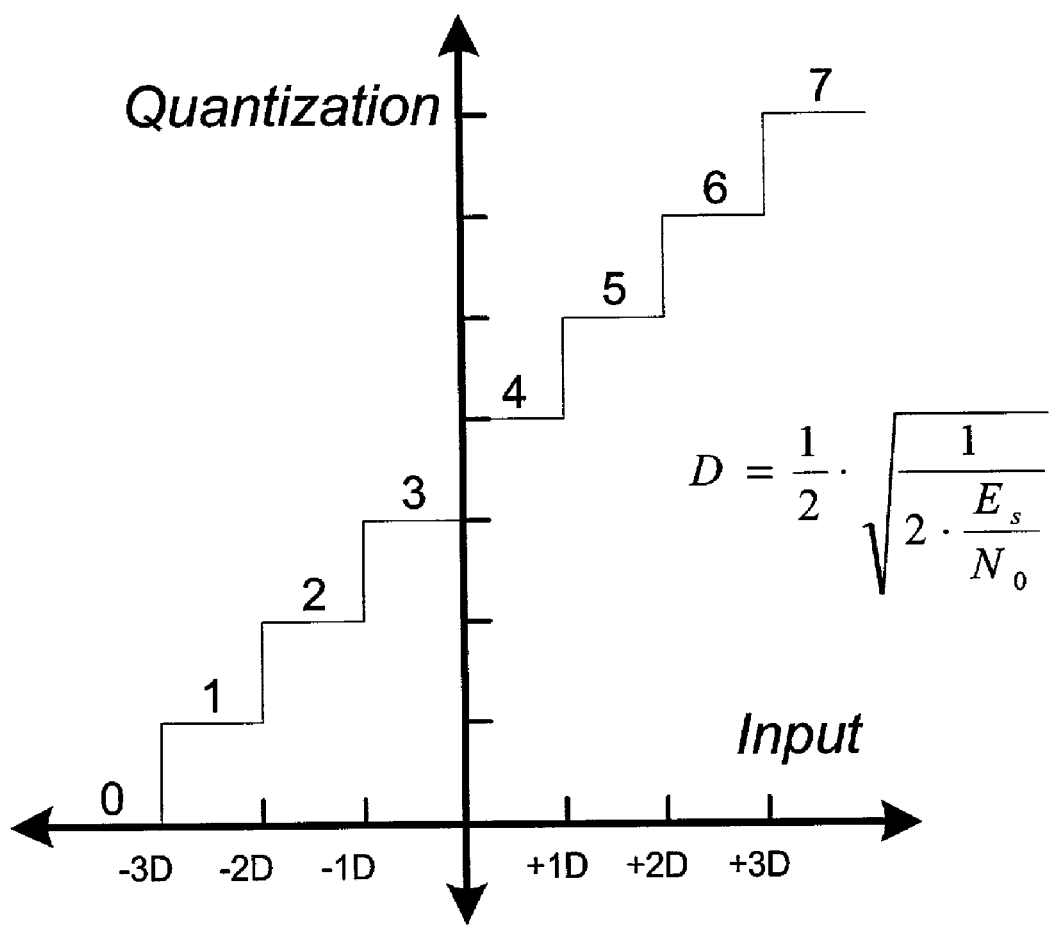
FIG. 5 is an illustration of adaptive soft quantization.

To make the decoder work, received channel symbols must be quantized. In hard decision decoding, channel symbols can be either 0 or 1. Hard decision Viterbi decoders can be extremely fast due to the small number of bits that are involved in the computations. However, tremendous BER improvements have been achieved by increasing the number of bits (resolution) used in quantizing the channel symbols. FIG. 5 shows an example of a uniform quantizer using 3-bits (8 levels) to represent a symbol received on the channel. The ratio Es/N0, the energy per symbol to noise density ratio, is used to calculate D, the decision level.

The present invention will now be illustrated with a more detailed example of optimizing an algorithm for a Viterbi decoder. There are many parameters that can effect the performance of the Viterbi decoder. The domain of the solution space is modeled as an 8-dimensional matrix. The parameters that constitute the degrees of freedom in the solution space are:

K—Constraint length $\{3,4,5,6,7, \ldots \}$;
L—Trace-back depth $\{1*K, 2*K, 3*K, 4*K, 5*K, \ldots \}$;
G—Encoder Polynomial(s);
R1—Quantization used for low-resolution decoding;
R2—Quantization used for high-resolution decoding (multi);
Q—Quantization method (hard, fixed, adaptive);
N—Normalization method; and
M—Number of multi-resolution paths $(1,2, \ldots ,2K-1)$.

The parameter K is the constraint length of the convolutional encoder and L is the trace-back depth of the decoder. Although K and L do not have any theoretical bounds, the search was limited to current practical values of K<10 and L<30*K. Experiments have shown that in most cases, trellis depths larger than 7*K do not have any significant impact on BER. There are several standard specifications of the encoder polynomial G for different values of K. The user has the option of selecting multiple variations of G to be included in the search, although in most cases G is fixed. The quantization resolution parameters R1 and R2 indicate the number of bits used in the calculation of the trellis branch metrics. As discussed earlier, higher number of bits (soft decision) translate to better BER performance. Also, the choice of the quantization resolution parameters R1 and R2, affect the multiresolution normalization method N. Currently, N specifies the number of branch metric values used in the calculation of the multi-resolution correction factor. For pure hard or soft decoding, this parameter is set to 0 and, for multiresolution decoding, 1 N M. The parameter M specifies the number of trellis states (paths) that are recalculated using higher resolution in multi-resolution decoding.

The performance of each instance of the Viterbi decoder is quantified in terms of the following three metrics: (i) bit error rate (BER) (ii) area, and (iii) throughput. Software simulation is used to measure the BER of each instance of the algorithm under varying signal to noise ratios. Generally, the user defines a threshold curve that serves as a guide for the desired BER performance. Area and throughput metrics are obtained by simulating the algorithm using Trimaran. Hewlett Packard Laboratories, the University of Illinois and the Georgia Institute of Technology developed the Trimaran system in a collaborative effort. Trimaran provides a compiler and hardware platform for parallel programmable VLIW and Superscalar architectures. Trimaran is used to estimate the area requirements of each candidate solution for a fixed throughput. Evaluation of each instance includes the steps of generating source code that Trimaran can compile and optimize and specifying the Trimaran hardware architecture parameters such as register file sizes, memory hierarchy, number of arithmetic logic units (ALU) and others. During the simulation, Trimaran collects several statistics for each solution instance including the total number of operations executed (load, store, ALU, branch, etc.) the total number of cycles required to complete the decoding task for a fixed number of bits, dynamic register allocation overhead, and several others. Using Trimaran area models, area requirements of each instance based on the desired throughput (clock rate) are generated.

The LSI Logic TR4101 microprocessor was used as the basis for the model for Trimaran hardware due to the similarities between the two architectures. This processor has a feature size of 0.35 m running at a maximum clock speed of 81 MHz.

The quadratic scaling factor:

$$(0.35)^2 \cdot \text{data\_path\_factor}$$

was used to scale the area to an architecture based on a feature size of m. The data_path_factor is used to adjust the area requirement based on the width of the data path (number of bits).

In the area model, it is assumed that clock rates scale linearly with feature size with smaller sizes resulting in faster clock rates. Also, to account for different data-path sizes, scaling factors were used to adjust the clock rate.

There are roughly 108 distinct points in the solution space for the Viterbi decoder example, whose domain has been defined as an eight dimensional matrix. While technically it is possible to perform an exhaustive search of such a large solution space, it is not practical because of the large amount of time which would be required to simulate every point in the solution space. Instead a multiresolution search technique is preferred to search the solution space in an efficient manner by concentrating efforts on promising regions. The search is initiated on a fixed grid in the solution space. For example, since eight dimensions have been defined for the Viterbi decoder, up to 256 instances are evaluated initially. However, in most practical cases this number can be much lower since some of the parameters are fixed (e.g. G, N). Using the performance evaluated at each point on the initial grid as a guide, regions that are most promising in terms of area, throughput, and BER are identified. The evaluation is then repeated in the most promising regions using a finer grid and more accurate simulation results (longer run times). The following pseudo code describes the search method:

```
R=Initial search resolution
G=Initial sparse search points
Procedure Viterbi_Metacore_Search(G,R) {
For each p_i G
p_i.BER=Simulate and measure BER
Find p_i Area using Trimaran using given p_i.Throughput
End For
NewGridSet=Refine_Grid(G)
NewR=R+Resolution_Increment
If (NewR<Max_Search_Resolution)
For each G_i NewGridSet
Viterbi_Metacore_Search(G_i,NewR)
}
```

When calculating the new grid (Refine_Grid) regions, regions enclosed by the points that are more likely to contain promising solutions are extracted. Since the area and throughput functions are smooth and continuous, interpolation is used between the points on the grid to calculate initial estimates. However, BER is probabilistic by nature and interpolation can lead to inaccurate conclusions especially if simulation times are kept short. Bayesian probabilistic techniques are used to assign a BER probability to each point $p_i$ G, based on the BER values of its neighbors. Essentially, conditional probabilities are associated with observed dependencies in the solution space points to predict most likely value at points that are still to be considered during the search. The search is then recursively executed on the newly formed regions with higher resolution to find and refine the best candidate solutions.

In general, the design space parameters are classified as: (i) discrete or continuous and (ii) correlated or non-correlated. The correlated parameters are further distinguished using their structures such as monotonic, linear, quadratic, probabilistic, etc. Clearly, non-correlated parameters are more difficult to handle since optimal solutions cannot be found as rapidly using heuristic techniques. Also, the search method presented above for the Viterbi Metacore design is clearly greedy. This design choice is justified by the speed of the searching mechanism and ease of implementation. However, the optimality of the search and the results can be increased using longer simulation times and relaxing the search space pruning technique at the cost of significantly longer runtimes.

The main user interface, multiresolution search algorithm, and the multiresolution Viterbi decoder simulator are implemented as a Microsoft Windows application using Visual C++ 6.0 IDE. The Trimaran environment is set up on an Intel Pentium III based PC running RedHat Linux 6.1. This configuration facilitates the parallel execution of the Viterbi software and hardware simulations. Several configuration files and scripts are used to specify the range of parameters used and automate user tasks.

FIG. 6 lists the results of several Viterbi decoder search outcomes using different parameter specifications. In each case, the BER and throughput were specified. Normalization (N) and polynomial (G) were fixed to speed up the search process. The estimated area requirement and the associated Viterbi decoder parameters are reported for comparison. In FIG. 6 the BER and throughput would be specified by the end user or customer, who would also normally specify a desired maximum area required for implementation. The eight specified parameters are determined from the search and simulation process of the present invention. Each set has been selected to provide a minimum silicon area estimate for implementation.

Figure 7:
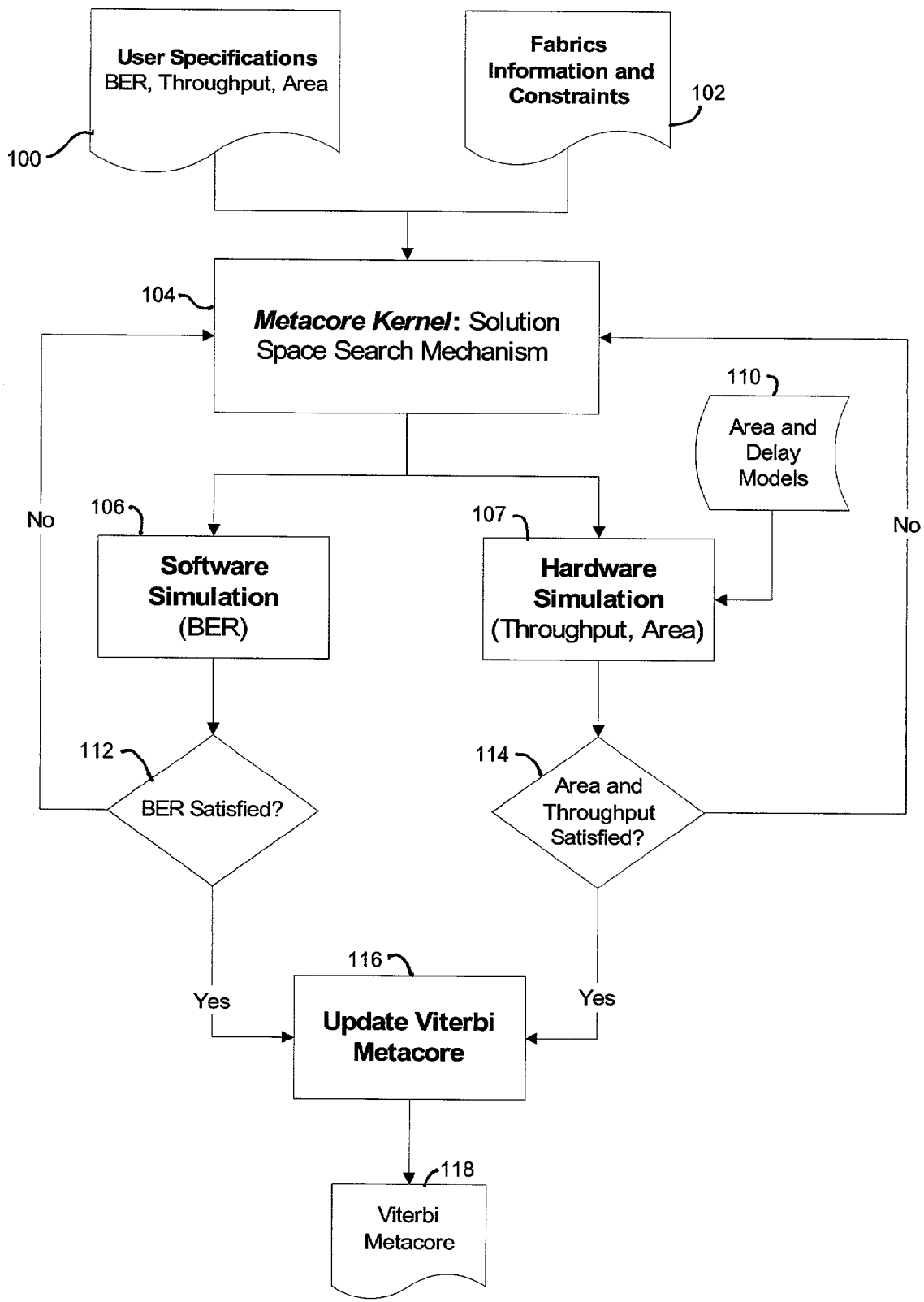
FIG. 7 is a flow chart of the method of the present invention.

With reference to FIG. 7, a more generalized flow chart of the process of the present invention is provided. This flow chart is directed to optimization of a Viterbi decoder application. At step 100, an end user or customer specifies the desired performance metrics of bit error rate and throughput and also specifies the maximum allowable silicon area. At step 102 the customer's choices with regard to the actual silicon technology to be used to implement the algorithm, e.g. ASIC, FPGA, Hard Macros, or Soft Cores. Constraints corresponding to the chosen technology are also provided as inputs in step 102. At step 104 the input specifications are used to define the adjustable parameters of the application algorithm, in this example the Viterbi algorithm. In the preferred form, a reasonably sized subset of the total possible combinations of parameter values distributed throughout the total solution space is selected. A subset is considered of reasonable size if the total simulation time required in the following steps is reasonable. In step 106 the algorithm is simulated as software to determine its BER. At step 107, which may occur simultaneously with step 106, the throughput and area requirements are simulated, for example with the Trimaran system. At step 110, area and delay models are fed to the simulation system performing step 107. At step 112, the BER values calculated in step 106 are compared to the user specification from step 100. If no acceptable values have been found, the process goes back to step 104 to expand the search looking for acceptable parameter sets. Likewise, at step 114, the results of step 107 are checked against the specifications from step 100. If the area and throughput specifications are not met, step 104 is repeated and expanded looking for acceptable parameter sets. When acceptable values are found in both steps 112 and 114 for the same parameter value combination, the corresponding parameter values are used to update the core model in step 116. These parameters are then used in step 118 to implement a core in soft, firm or hard form as determined by other considerations.

While the above examples have involved development of a Viterbi decoder, the method of the present invention is equally applicable to other types of applications. For each application, a selected algorithm can be modeled in terms of its adjustable parameters and reasonable ranges of the parameters. As noted above, many parameters have large theoretical ranges, but small practical ranges. Every application also has a set of one or more performance metrics by which its performance can be measured.

The method of the present invention was also used to optimize an infinite impulse response, IIR, filter. Several parameters impact the performance and the computational complexity of IIR filters. The following degrees of freedom: topological structure, number of stages, word length, and pass band ripple characteristics were considered. The performance of an instance of an IIR filter was measured using the following criteria: (i) 3-dB bandwidth, (ii) area, (iii) throughput, and (iv) latency. SPW software simulations were used to measure gain, 3-dB bandwidth, pass band ripple, and stop band attenuation characteristics. Area, throughput, and latency were obtained using the HYPER behavioral synthesis tools. Specifically, HYPER tools were used for early estimation of both active logic area (execution units, registers, and interconnect) as well as statistical tools for prediction of total area. The final implementation was obtained using Hyper and Lager tools.

Evaluation of each candidate for implementation started by entering user specified transfer functions in SPW and consequently generating Silage code which was used as input to the HYPER behavioral synthesis tool. HYPER also outputs timing information such as the length of the clock cycle and the number of cycles used. This information was used to compute throughput and latency. The process provided good results in terms of minimizing silicon area required to implement an IIR with desired performance specifications. The average and median reduction in area over all designs generated during the search process were 75.12% and 71.92% respectively.

While the present invention has been illustrated and described in terms of particular apparatus and methods of use, it is apparent that equivalent parts may be substituted of those shown and other changes can be made within the scope of the present invention as defined by the appended claims.

What is claimed:

1. A method for designing an integrated circuit, comprising:

selecting an algorithm for implementation as an integrated circuit, specifying performance metrics for a set of one or more characteristics of said integrated circuit, specifying a maximum allowable area for said integrated circuit, identifying N adjustable parameters for said algorithm, creating a $N^{th}$-dimensional solution space comprised of a set of combinations, each combination comprised of a value for each of said N identified adjustable parameters, selecting, from said set of combinations forming said $N^{th}$ dimensional solution space, a first subset of said set of combinations, for each one of said first subset of combinations, performing a first simulation of said algorithm to determine said performance metrics for each one of said first set of characteristics of said integrated circuit, for each one of said first subset of combinations, performing a second simulation of said algorithm to determine an area of said integrated circuit, for each one of said first subset of combinations, comparing said performance metrics for said set of characteristics produced from said first simulation to said specified performance metrics for said set of characteristics of said integrated circuit, and for each one of said first subset of combinations, comparing the area of said integrated circuit produced from said second simulation to said specified maximum allowable area of said integrated circuit.

2. A method according to claim 1, further including:

selecting a second subset of combinations of said values, for each one of said second subset of combinations, performing a first simulation of said algorithm to determine said performance metrics for each one of said first set of characteristics of said integrated circuit, for each one of said second subset of combinations, performing a second simulation of said algorithm to determine the area of said integrated circuit, for each one of said second subset of combinations, comparing said performance metrics for said set of characteristics produced from said first simulation based on said each one of said second subset of combinations to said specified performance metrics for said set of characteristics of said integrated circuit, and for each one of said second subset of combinations, comparing the area of said integrated circuit produced from said second simulation based on said each one of said second subset of combination to said specified maximum allowable area of said integrated circuit;

wherein said first subset of combinations forms a first grid and second subset of combinations forms a second grid finer than said first grid.

3. A method according to claim 2, wherein:

said values of said second subset of combinations are near said values of said first subset of combinations.

4. A method according to claim 1 and further comprising:

specifying a throughput value for said integrated circuit, and wherein performing a second simulation of said algorithm further determines throughput for said integrated circuit, and wherein comparing the area of said integrated circuit produced from said second simulation to said specified maximum allowable area of said integrated circuit further comprises comparing the throughput of said integrated circuit produced from said second simulation to said specified throughput value for said integrated circuit.

5. A method according to claim 4, and further comprising selecting, from said first subset of combinations, a matching set of values for said identified parameters, one of said subset of combinations being selected as set matching set of values if: (a) said performance metrics for said set of characteristics were, based upon the comparison to said specified performance metrics for said set of characteristics, determined to be acceptable, (b) said determined area of said integrated circuit was, based upon the comparison to said specified maximum allowable area, determined to be acceptable; and (c) said determined throughput of said integrated circuit was, based upon the comparison to said specified throughput, determined to be acceptable.

6. A method according to claim 5, and further comprising implementing a core containing said algorithm and said selected one of said first subset of combinations.

7. A method according to claim 5, and further comprising selecting, from said set of combinations forming said solution space, a new subset of combinations of said identified parameter values if, for each one of said first subset of combinations: (a) said performance metrics for said set of characteristics were, based upon the comparison to said specified performance metrics for said set of characteristics, determined to be unacceptable, (b) said determined area of said integrated circuit was, based upon the comparison to said specified maximum allowable area, determined to be unacceptable; or (c) said determined throughput of said integrated circuit was, based upon the comparison to said specified throughput, determined to be unacceptable.

8. A method according to claim 7, and further comprising using said new subset of combinations to repeatedly perform a first simulation of said algorithm, perform a second simulation of said algorithm, compare said performance metrics produced from said first simulation to said specified performance metrics for said set of characteristics, compare the area produced from said second simulation to said specified maximum allowable area, compare the throughput produced from said second simulation to said specified throughput and select a new subset of combinations until an acceptable subset of combinations is identified.

9. A method according to claim 8, wherein:

said solution space is an $8^{th}$-dimensional solution space, said adjustable parameters which form said $8^{th}$-dimensional solution space include constraint length, traceback depth, encoder polynomials, quantization used for low-resolution decoder, quantization method, normalization method and number of multi-resolution paths, and said integrated circuit is a Viterbi decoder.

10. A method according to claim 9, wherein:

said characteristics of said Viterbi decoder includes a bit error rate, said first simulation is a software simulation for determining said bit error rate for said Viterbi decoder, and said second simulation is a Trimaran simulation for determining the area of said Viterbi decoder.

11. A method according to claim 4, wherein:

said characteristics of said integrated circuit includes a bit error rate, said first simulation is a software simulation for determining said bit error rate for said integrated circuit, and said second simulation is a Trimaran simulation for determining the area and throughput of said integrated circuit.

12. A method according to claim 1, and further comprising selecting, from said first subset of combinations, a matching set of values for said identified parameters, one of said subset of combinations being selected as set matching set of values if: (a) said performance metrics for said set of characteristics were, based upon the comparison to said specified performance metrics for said set of characteristics, determined to be acceptable, and (b) said determined area of said integrated circuit was, based upon the comparison to said specified maximum allowable area, determined to be acceptable.

13. A method according to claim 12, and further comprising implementing a core containing said algorithm and said matching set of values for said identified parameters.

14. A method according to claim 12, and further comprising selecting, from said set of combinations forming said solution space, a new subset of combinations of said identified parameter values if: (a) for each one of said first subset of combinations, said performance metrics for said set of characteristics were, based upon the comparison to said specified performance metrics for said set of characteristics, determined to be unacceptable, or (b) for each one of said first subset of combinations, said determined area of said integrated circuit was, based upon the comparison to said specified maximum allowable area, determined to be unacceptable.

15. A method according to claim 14, and further comprising using said next subset of combinations to repeatedly perform a first simulation of said algorithm, perform a second simulation of said algorithm, compare said performance metrics produced from said first simulation to said specified performance metrics for said set of characteristics, compare the area produced from said second simulation to said specified maximum allowable area and select a new subset of combinations until an acceptable subset of combinations is identified.

16. A method according to claim 1, wherein:
said characteristics of said integrated circuit includes a bit error rate,
said first simulation is a software simulation for determining said bit error rate for said integrated circuit, and
said second simulation is a Trimaran simulation for determining the area of said integrated circuit.

17. The process of implementing an algorithm on a chip comprising:
selecting a set of algorithm parameters which provides acceptable performance characteristics and is implemented on the smallest chip area, said selecting of said set of algorithm parameters further comprising:
identifying algorithm parameters which affect performance, and
performing a multiresolution search of a solution set containing reasonable combinations of algorithm parameters to determine algorithm performance for each combination, said performing said multiresolution search of said solution set further comprising:
simulating (a) algorithm performance for said set of algorithm parameters, and (b) algorithm performance for said chip area until a subset of parameter combinations comprising those combinations which meet a preselected set of performance metrics and have a chip area less than a preselected maximum allowable area are selected.

18. The process according to claim 17 wherein said performing of said multiresolution search of said solution set further comprises simulating (c) algorithm performance for throughput of said chip until a subset of parameter combinations comprising those combinations which meet a preselected set of performance metrics, meet a preselected throughput threshold value and have a chip area less than a preselected maximum allowable area are selected.

19. The process according to claim 17, further comprising:
selecting the parameter combination having the smallest estimated chip area.

20. The process according to claim 19, further comprising:
implementing said algorithm with said selected parameter combination on a chip.

21. The process according to claim 17, further comprising:
selecting a first sample of parameter combinations distributed throughout said solution set,
operating said computer with said software to simulate algorithm performance for each combination of algorithm parameters in said first sample to determine algorithm performance for each combination in said sample, and
selecting a second sample of combination values comprising those combinations from said first sample which meet preselected performance metrics.

22. The process according to claim 21, further comprising:
selecting a third sample of parameter combinations from said solution set, said third sample comprising combinations having parameter values near combinations contained in said second sample, and
operating said computer with said software to simulate algorithm performance for each combination of algorithm parameters in said third sample to determine algorithm performance for each combination in said third sample.

* * * * *